United States Patent [19]

Croft et al.

[11] Patent Number: 5,300,324
[45] Date of Patent: Apr. 5, 1994

[54] PROCESS TO INCREASE THE DRYING RATE OF A GLAZE FOR CERAMICS

[75] Inventors: Alan P. Croft, Lake Jackson; Byford D. Sheffield, Brazoria, both of Tex.

[73] Assignee: The Dow Chemical Company, Midland, Mich.

[21] Appl. No.: 891,330

[22] Filed: May 29, 1992

[51] Int. Cl.$^5$ .............................. C03C 8/14; C03C 8/16
[52] U.S. Cl. ................................. 427/376.2; 501/20; 501/17
[58] Field of Search ................. 501/20, 17; 427/376.2

[56] References Cited

U.S. PATENT DOCUMENTS

| | | | |
|---|---|---|---|
| 2,930,713 | 3/1960 | Hoffman | 501/20 |
| 3,226,784 | 1/1966 | Owen et al. | 22/193 |
| 3,472,803 | 10/1969 | Andrews et al. | 260/17 |
| 3,507,944 | 8/1970 | Moore | 264/109 |
| 4,106,949 | 8/1978 | Malden | 106/288 B |
| 4,915,890 | 4/1990 | Koblinski et al. | 264/87 |
| 5,034,448 | 7/1991 | Koblinski et al. | 524/447 |
| 5,057,467 | 10/1991 | Croft | 501/148 |
| 5,145,624 | 8/1992 | Croft | 264/109 |

FOREIGN PATENT DOCUMENTS 912702 3/1982 U.S.S.R. .

*Primary Examiner*—Mark L. Bell
*Assistant Examiner*—C. M. Bonner
*Attorney, Agent, or Firm*—Robert M. O'Keefe

[57] ABSTRACT

The drying rate of glazes containing water used to coat ceramic articles is increased by addition of aminoethylethanolamine, one or more polyalkylene polyamines with or without a small amount of a styrene-butadiene latex.

12 Claims, No Drawings

PROCESS TO INCREASE THE DRYING RATE OF A GLAZE FOR CERAMICS

BACKGROUND OF THE INVENTION

This invention relates to the glazing of ceramic articles.

Glazing is a well known technique wherein ceramic articles are coated with a glaze containing water, thereby providing a smooth, glassy, and oftentimes colorful finish after drying and firing. Glazes typically contain water, a metal oxide pigment, a glass frit material, one or more fillers and suspending agents, and one or more additives that effect viscosity. Glazes are most often applied to whiteware ceramic articles such as toilet fixtures, bathroom tiles, plates, cups, bowls, and the like. A problem exists in the making of such glazes articles, however, in that an undesirably long amount of time is required for the glaze to dry after being applied to a ceramic article, thereby increasing the manufacturing cost of such products.

SUMMARY OF THE INVENTION

This invention, in one respect, is a process to increase the drying rate in a glazing process, comprising applying a glaze mixture comprising water and glass frit to a ceramic article, the glaze mixture containing an additive selected from the group consisting of aminoethylethanolamine, one or more polyalkylene polyamines with or without a latex, and mixtures thereof wherein the additive is present in an amount effective to increase the drying rate of the glaze mixture. In another respect, this invention further comprises drying the glazed ceramic article at a temperature of from about 20° C. to about 150° C. and under conditions such that the humidity is less than about 80 percent to form a dry glazed ceramic article.

This invention increases the drying rate in a typical glazing process for the production of glazed ceramics such as ceramic whiteware. Advantageously, an increase in the drying rate allows glazed ceramic articles treated in accordance with this invention to be capable of being fired in a shorter time to form the final articles of commerce. Such decrease in time can be beneficial to a manufacturer and help reduce production costs.

DETAILED DESCRIPTION OF THE INVENTION

The drying rate of a glaze containing water, a metal oxide pigment, and a glass frit material is increased according to this invention by adding an additive selected from the group consisting of aminoethylethanolamine, one or more polyalkylene polyamines, one or more polyalkylene polyamines and a latex, and mixtures thereof to the glaze. It is preferred to employ a polyalkylene polyamine having an average molecular weight of less than about 1,000, more preferably less than about 800. Suitable polyalkylene polyamines can be straight chain, branched, cyclic, or combinations thereof. Examples of preferred polyalkylene polyamines are ethylenediamine, triethylenetetramine, tetraethylenepentamine, pentaethylenehexamine, hexaethyleneheptamine, heptaethyleneoctamine, piperazine, aminoethylpiperazine, propylenediamine, butylenediamine, pentamethylenediamine, hexamethylenediamine, diethylenetriamine, dipropylenetriamine, dibutylenetriamine, bis(pentamethylene)triamine, bis(hexamethylene)triamine, tripropylenetetramine, tris(hexamethylene)tetramine, tetrapropylenepentamine, tetrabutylenepentamine, tetrakis(pentamethylene)pentamine, tetrakis(hexamethylene)pentamine, pentapropylenehexamine, pentabutylenehexamine, pentakis(pentamethylene)hexamine, pentakis(hexamethylene)hexamine, pentakis(hexamethylene)hexamine, bis(aminopropyl)ethylenediamine, bis(aminopropyl)diethylenetriamine, and tris(aminopropyl)ethylenediamine. More preferably, the polyalkylene polyamine is ethylenediamine, diethylenetriamine, triethylenepentamine, tetraethylenepentamine, and piperazine. Mixtures of polyalkylene polyamines can be employed in the practice of this invention as well as mixtures of one or more polyalkylene polyamines and aminoethylethanolamine. An example of a mixture useful in this invention is a commercial product available from The Dow Chemical Company sold under the name Ethyleneamine 100 which is a blend of polyalkylene polyamine isomers having similar boiling points from about 240 to about 260 and average molecular weights of about 250 to about 300.

Additionally, well known latexes can be used in combination with one or more polyalkylene polyamines. Examples of suitable latexes are styrene-butadiene latexes, acrylic latexes, and ethyleneacrylic acid latexes. Styrene-butadiene latex is preferred. One such commercially available styrene-butadiene latex is SB Latex 233A produced by the Dow Chemical Company. Surprisingly, the combination increases even further the drying rate of a glaze. When the weight ratio of one or more polyalkylene polyamines to latex is less than about 80:20, however, a ceramic article treated with this combination becomes opaque or hazy. Such articles are less desirable products as compared to clear, translucent glazed ceramic articles. Hence, if a latex is used in combination with one or more polyalkylene polyamines, the weight ratio of one or more polyalkylene polyamines to latex is preferably no less than about 90:10, more preferably no less than about 95:5. Most preferably, the weight ratio of one or more polyalkylene polyamines to latex is about 98:2.

The additive employed in the practice of this invention is used in any amount effective to increase the drying rate of a glaze relative to a glaze that is identical except for the presence of aminoethylethanolamine or polyalkylene polyamine with or without a latex or mixture thereof. Generally, the amount employed is from about 1 ppm to about 10,000 ppm of the admixed glaze. Preferably, the amount employed is from about 100 ppm to about 5000 ppm of the admixed glaze. Most preferably, the amount is from about 500 ppm to about 1000 ppm of the admixed glaze.

The increase in drying rate achieved by the practice of this invention will vary depending on the amount of additive employed in a glaze. Typically, the addition of the additive of this invention results in a drying rate percent increase of greater than about 2 percent. Preferably, the drying rate increase is greater than about 10 percent, more preferably greater than about 15 percent.

The additive is added prior to application of the glaze to a ceramic article. A glaze useful in the practice of this invention comprises water, a metal oxide pigment, a glass frit material, and one or more polyalkylene polamines. In addition, the glaze can further comprise one or more fillers or suspending agents, and one or more additives that effect viscosity. Glazes are typically low in sodium.

A required component of a glaze is a glass frit material. Glass frit is ground glass, often containing a lead component. When a dry, glazed ceramic article is fired, the glass frit material forms a glass, thereby imparting the desired finish to the final ceramic article. The amount of glass frit employed in a glaze can vary widely. Generally, the amount of glass frit in a glaze is from about 10 to about 30 weight percent.

Suitable metal oxide pigments useful in the practice of this invention are well known to those skilled in the art. Metal oxide pigments are also known as glaze stains. Examples of metal oxide pigments are finely ground calcined oxides of aluminum, antimony, boron, chromium, cobalt, copper, iron, lead, manganese, nickel, tin, titanium, vanadium, zinc, and zirconium. Combinations of suitable metal oxide pigments can be employed. Metal oxide pigments typically comprise from about 1 to about 20 weight percent of a glaze.

Since glass frit is costly, various fillers and suspending agents are often added to a glaze. While not required, fillers and suspending agents reduce the cost of the glaze. Examples of fillers and suspending agents commonly employed by skilled artisans are mixtures of silicates such as feldspars; clays such as bentonite; flint; calcium or sodium carbonate; zirconium silicates; magnesium silicates; calcium silicates; calcium sulphates such as gypsum; and boric acid. The amount of fillers and suspending agents used in a glaze can vary widely. Typically, one or more fillers and suspending agents comprise from about 10 to about 50 weight percent of the glaze.

In addition, various additional components can be added to glaze. Such components are commonly employed to thicken the glaze, for instance. Examples of commonly employed additives used in glazes are carboxymethylcellulose and methyl cellulose. An example of a commercially available methyl cellulose is Methocel ™ which is available from the The Dow Chemical Company.

The glaze is prepared by combining water, one or more polyalkylene polyamines with or without a latex, glass frit, and one or more metal oxide pigments. The combination is mixed to evenly disperse these components of the glaze. Fillers, suspending agents, and thickeners can also be added if desired, but are not required for the practice of this invention. The resulting admixture contains an amount of water sufficient to allow the glaze to be applied to a ceramic article using conventional applicators. The amount of water required is readily ascertainable by skilled artisans. Generally, the proportion of water to total solids in a glaze is from about 0.5:1 to about 2:1, preferably about 1:1.

The glaze can be prepared in conventional apparatus designed for such purpose. Typically, a glaze is prepared batchwise in a vessel equipped with a mechanical stirring means. Generally, a ball mill is used for this purpose. The amount of time required to thoroughly admix the glaze can vary widely depending on several variables such as temperature, amount of glaze to be stirred, and the stirring rate. The amount of time required to admix the glaze is not critical to the practice of this invention.

Once prepared, the glaze can be applied to ceramic articles by conventional techniques. For example, the ceramic article can be dipped in a glaze or the glaze can be brushed onto the ceramic article. In a commercial operation, the glaze is commonly applied by dipping or spraying.

After the glaze is applied, the glazed ceramic article is allowed to dry by evaporation. The amount of time required to dry will vary widely depending on conditions. Generally, the temperature is from about 10° C. to about 150° C. and the humidity in the area of the drying articles is less than about 80 percent. Preferably, the humidity is less than about 70 percent. Most preferably, the humidity is from about 40 percent to about 60 percent. Preferably, temperature is in the range from about 20° C. to about 150° C. The articles can be dried in a drier at about 110° C. More preferably, temperature is in the range from about 20° C. to about 110° C.

When the articles are suitably dried as is apparent to one skilled in the art, the dry, glazed ceramic articles can be fired in conventional firing apparatus to yield the final product. Generally, firing is conducted in kilns operating at temperatures of from about 500° C. to about 2000° C. The dryness of a glazed ceramic article can be measured by a number of well know techniques. One example of a measurement technique is to measure light reflectance of the glaze using a conventional apparatus designed for this purpose. Such apparatus are commonly referred to as reflectometers. An example of a reflectometer that is commercially available is the Colorgard 45°/0° Reflectometer produced by Pacific Scientific ™ Gardner/Neotec Instrument Division.

The following examples are given to illustrate the invention and should not be interpreted as limiting it in any way. Unless stated otherwise, all parts and percentages are given by weight.

In the examples, whiteware coupons are used to test the glazes and are prepared according to the following procedure. Slip formulations are prepared in batches of 1200 grams. The following procedure is for a typical 73 percent solids whiteware slip. To a vessel are added 88.8 grams of a 1.0 percent sodium silicate solution, 14.0 grams of a 1.0 percent soda ash (sodium carbonate), 0.23 gram of calcium sulfate dihydrate, and 220.6 grams of deionized water. This mixture is added to a 2 liter ball mill jar and then thoroughly stirred with a mixer. The following additional materials are added to the ball mill jar: 307.2 grams of ball clay, 188.4 grams of kaolin clay, 262.8 grams of feldspar, and 117.6 grams of flint. The mixture is thoroughly stirred with a mixer. Next, 30 milling stones (13/16 × 13/16 inch) are added to the jar. The jar is sealed and is placed on a ball mill, with the contents being milled for one hour. The viscosity of the contents after milling is 1000 to 1200 cps at 12 rmp with a #3 spindle as measured on a Brookfield Digital Viscometer Model DVII. The contents are then poured into three assembled plaster of paris molds, each mold capable of producing 10 coupons per casting. The slip is allowed to case for one hour after which time the coupons are removed. The dimensions of the coupons are 1 × 1 × ¼ inch. The coupons are allowed to air dry overnight. The coupons are then placed in a 60° C. oven for six hours. The coupons are then transferred to a 110° oven for 24 hours. The coupons are then removed from the oven and stored in a desiccator until use. Two castings (60 coupons) are prepared for each test below; 30 coupons for the control and 30 coupons for the experimental glaze.

EXAMPLE 1

Glaze Preparation

Glazes are prepared in batches of 750 grams. The following procedure is for a generic white porcelain glaze. The glazes are prepared in a 1 liter ball mill jar. To the jar are added either 0, 500, 750, or 1000 ppm of the additive defined in Table I, below. To the additive is added between 374.25 and 375.0 grams of deionized water, depending on the loading level of the additive. The water/additive mixture is stirred thoroughly with a mixer. The total weight of water and additive, if present, is 375.0 grams. The following materials are then added to the water solution with thorough mixing between each addition: 37.08 grams of flint, 66.45 grams of feldspar, 33.41 grams of wollastonite which is a mineral of calcium silicate (Vansil W20 TM, available commercially from R. T. Vanderbilt Company, Inc.), 33.04 grams of zirconium silicate (Ultrox TM available commercially from Atochem North America, Inc.), 37.08 grams of zinc oxide, 165.93 grams of glass frit containing lead (Ferrofrit 3467 TM available commercially from Ferro Corporation, Frit Division). The following components are added without stirring: 0.73 gram of a complex colloidal magnesium silicate (VEE Gum T TM, available commercially from R. T. Vanderbilt Company, Inc.) 0.92 gram of carboxymethylcellulose (Aldrich), and 0.37 gram of hydrated aluminum silicate (Bentonite TM ECC America Inc., Southern Clay Products). To this mixture is added 30 milling stones. The jar is sealed and is placed on a ball mill and milled for 7.5 hours. Next, the jar is opened. The viscosity of the glaze as reported in Table 1 is measured on a Brookfield Digital Viscometer Model DV-II at 12 rpm with a #3 spindle. The batches of control and experimental glazes are divided into halves. Each half (control and experimental) is used to glaze 15 coupons, as described hereinbelow, from one of the castings (5 coupons from each mold.) This process is repeated with the remaining half batches of glazes and the 30 coupons from the second casting.

EXAMPLE 2

Glaze Evaluation

The glaze formulation is continuously stirred with a magnetic stirrer to insure all the solids are suspended. The test coupon is removed from the desiccator with forceps and submerged into the glaze for about 4.75 seconds. The glazed coupon is then placed in the holder provided for the reflectometer, it being a Colorgard 45°/0° Reflectometer. The reflectometer is placed over the coupon and reflectance measurements are taken every 0.5 minute at ambient temperature until constant reflectance is obtained (three readings with constant measurements). The time required to reach constant reflectance is accepted as the point of dryness for the glaze coating. The results are shown in Table 1. The increase in drying rate is expressed as a percentage increase relative to a control having no additive. The styrene-butadiene latex used in SB Latex 233A available commercially from The Dow Chemical Company. Ethyleneamine 100 is used in the examples which is a blend of polyalkylene polyamine isomers having similar boiling points from about 240 to about 260 and average molecular weights of about 250 to about 300. Ethyleneamine 100 is commercially available from The Dow Chemical Company. As used in Table I, "E-100" denotes Ethyleneamine E-100. As defined herein, "EDA" means ethylenediamine, "DETA" means diethylenetriamine, "TETA" means triethylenetetramine, "TEPA" means tetraethylenepentamine, "PIP" means piperazine, and "AEEA" means aminoethylethanolamine.

TABLE 1

| Additive Type In Glaze Formulation | Amine Additive I (%) | Amine Additive II (%) | Latex Additive (%) | Additive Conc. (ppm) | Control Glaze Viscosity (cps) | Exper. Glaze Viscosity (cps) | Increase Drying Rate (%) |
| --- | --- | --- | --- | --- | --- | --- | --- |
| EDA | 100 | 0 | 0 | 750 | 60 | 40 | 19.9 |
| DETA | 100 | 0 | 0 | 750 | 50 | 20 | 13.2 |
| TETA | 100 | 0 | 0 | 750 | 70 | 50 | 12.3 |
| TEPA | 100 | 0 | 0 | 750 | 50 | 30 | 16.7 |
| E-100 | 100 | 0 | 0 | 750 | 50 | 60 | 19.0 |
| PIP | 100 | 0 | 0 | 750 | 50 | 30 | 3.6 |
| AEEA | 100 | 0 | 0 | 750 | 50 | 30 | 20.5 |
| TEPA/Latex | 98 | 0 | 2 | 500 | 55 | 40 | 7.8 |
| TEPA/Latex | 98 | 0 | 2 | 750 | 50 | 30 | 23.4 |
| TEPA/Latex | 98 | 0 | 2 | 1000 | 50 | 10 | 24.3 |
| TETA/TEPA/Latex | 29 | 69 | 2 | 500 | 70 | 50 | 5.4 |
| TETA/TEPA/Latex | 29 | 69 | 2 | 750 | 70 | 35 | 22.0 |
| TETA/TEPA/Latex | 29 | 69 | 2 | 1000 | 60 | 40 | 20.5 |

What is claimed is:

1. In a glazing process wherein a glaze mixture comprising water and glass frit is applied to a ceramic article, the improvement comprising adding to the glaze mixture an additive selected from the group consisting of aminoethylethanolamine, one or more polyalkylene polyamines with or without a latex, and mixtures thereof wherein the additive is added in an amount effective to increase the drying rate of the glaze mixture.

2. The process of claim 1 wherein the glaze mixture further comprises one or more metal oxide pigments.

3. The process of claim 2 wherein the one or more metal oxide pigments is an oxide of aluminum, antimony, boron, chromium, cobalt, copper, iron, lead, manganese, nickel, tin, titanium, vanadium, zinc, and zirconium.

4. The process of claim 1 wherein the glaze mixture further comprises one or more fillers or suspending agents.

5. The process of claim 4 wherein the glaze mixture further comprises one or more thickeners.

6. The process of claim 1 wherein the one or more polyalkylene polyamines have an average molecular weight of less than about 800.

7. The process of claim 1 wherein the polyalkylene polyamines are selected from the group consisting of ethylenediamine, triethylenetetramine, tetraethylenepentamine, pentaethylenehexamine, hexaethyleneheptamine, piperazine, aminoethylpiperazine, propylenediamine, butylenediamine, pentamethylenediamine, hexamethylenediamine, heptaethyleneoctamine, diethylenetriamine, dipropylenetriamine, dibutylenetriamine, bis(pentamethylene)triamine, bis(hexamethylene)triamine, tripropylenetetramine, tris(hexamethylene)tetramine, tetrapropylenepentamine, tetrabutylenepentamine, tetrakis(pentamethylene)pentamine, tetrakis(hexamethylene)pentamine, pentapropylhexamine, pentabutylenehexamine, pentakis(pentamethylene)hexamine, pentakis(hexamethylene)hexamine, pentakis(hexamethylene)hexamine, bis(aminopropyl)ethylenediamine, bis(aminopropyl)diethylenetriamine, tris(aminopropyl)ethylenediamine, and mixtures thereof.

8. The process of claim 1 wherein the glaze mixture contains one or more polyalkylene polyamines and a latex, and the weight ratio of one or more polyalkylene polyamines to latex is less than about 95:5.

9. The process of claim 1 wherein the amount of additive is from about 100 ppm to 5000 ppm of the admixed glaze.

10. The process of claim 1 wherein the amount of additive is from about 500 ppm to about 1000 ppm of the admixed glaze.

11. The process of claim 1 further comprising drying the glazed ceramic article at a temperature of from about 20° C. to about 150° C. and under conditions such that the humidity is less than about 80 percent to form a dry glazed ceramic article.

12. In a glazing process wherein a glaze mixture comprising water and glass frit is applied to a ceramic article, the improvement comprising adding to the glaze mixture an additive selected from the group consisting of aminoethylethanolamine, one or more polyalkylene polyamines with or without a latex, and mixtures thereof wherein the additive is added in an amount effective to increase the drying rate of the glaze mixture and wherein the weight ratio of one or more polyalkylene polyamines to latex is about 98:2.

* * * * *